US011678618B1

(12) United States Patent
Hrudka

(10) Patent No.: US 11,678,618 B1
(45) Date of Patent: Jun. 20, 2023

(54) MUSHROOM GROWING APPARATUS, SYSTEMS AND METHODS

(71) Applicant: Brian Hrudka, Chapel Hill, NC (US)

(72) Inventor: Brian Hrudka, Chapel Hill, NC (US)

( * ) Notice: Subject to any disclaimer, the term of this patent is extended or adjusted under 35 U.S.C. 154(b) by 0 days.

(21) Appl. No.: 17/668,171

(22) Filed: Feb. 9, 2022

(51) Int. Cl.
*A01G 18/69* (2018.01)
*A01G 18/50* (2018.01)
*A01G 18/62* (2018.01)

(52) U.S. Cl.
CPC ............. *A01G 18/69* (2018.02); *A01G 18/50* (2018.02); *A01G 18/62* (2018.02)

(58) Field of Classification Search
CPC ......... A01G 18/62; A01G 18/69; A01G 18/50
See application file for complete search history.

(56) References Cited

U.S. PATENT DOCUMENTS

| | | | | |
|---|---|---|---|---|
| 1,773,648 A | * | 8/1930 | Steves | A01G 18/69 71/21 |
| 1,808,383 A | * | 6/1931 | Steves | A01G 18/69 47/1.1 |
| 2,723,493 A | * | 11/1955 | Stoller | A01G 18/20 172/111 |
| 3,242,614 A | * | 3/1966 | Thompson | A01G 18/64 47/1.1 |
| 3,810,327 A | * | 5/1974 | Giansante | A01G 18/69 47/17 |
| 3,820,278 A | * | 6/1974 | Giasante | C05F 17/90 47/1.1 |
| 3,999,329 A | * | 12/1976 | Brais | A01G 9/246 47/17 |
| 4,267,664 A | * | 5/1981 | Henke | A01G 18/20 47/1.1 |
| 5,058,316 A | | 10/1991 | Watari | |
| 5,097,623 A | | 3/1992 | Furuya et al. | |
| 6,018,906 A | * | 2/2000 | Pia | A01G 18/62 47/1.1 |
| 6,748,696 B1 | | 6/2004 | Davidson | |

(Continued)

FOREIGN PATENT DOCUMENTS

| | | |
|---|---|---|
| CN | 102715031 A | 10/2012 |
| CN | 106665111 A | 5/2017 |

(Continued)

*Primary Examiner* — Monica L Perry
*Assistant Examiner* — Aaron M Rodziwicz
(74) *Attorney, Agent, or Firm* — Myers Bigel, P.A.

(57) ABSTRACT

An organic growth substrate, which supports mushroom growth from an inoculum of the species to be grown, is disposed within a growing apparatus impervious to microbiological contamination from an external environment and operationally associated with an environmental control apparatus. The environmental control apparatus modulates air, water, thermal, and light inputs to, and outputs from, one or more growing apparatuses to establish and maintain the desired environment within the growing apparatus. The system operates via a plurality of sensing, digital processing and mechanical components governed by software algorithms and operator input. A lyophilizer freeze dries harvested mushrooms for storage stability purposes. The system is configured to exchange information with the operator via a user interface and wireless connection to remote devices.

7 Claims, 12 Drawing Sheets

(56) References Cited

U.S. PATENT DOCUMENTS

| | | | |
|---|---|---|---|
| 7,383,661 B2* | 6/2008 | Toto | A01G 18/62 47/1.1 |
| 7,647,725 B2* | 1/2010 | Toto | A01G 18/69 47/1.1 |
| 11,185,027 B2* | 11/2021 | Christiaens | A01G 18/62 |
| 2013/0199088 A1 | 8/2013 | Juscius | |
| 2018/0279563 A1 | 10/2018 | Wolfe et al. | |
| 2019/0246571 A1 | 8/2019 | Ingram-Tedd et al. | |
| 2020/0037524 A1 | 2/2020 | Friedman | |

FOREIGN PATENT DOCUMENTS

| | | |
|---|---|---|
| EP | 0559681 B1 | 9/1996 |
| KR | 20120113156 A | 10/2012 |
| KR | 20200039854 A | 4/2020 |
| WO | 2019226046 A1 | 11/2019 |

* cited by examiner

MUSHROOM GROWING APPARATUS, SYSTEMS AND METHODS

FIELD OF THE INVENTION

The present invention relates generally to mushrooms and, more particularly, to the cultivation of mushrooms.

BACKGROUND OF THE INVENTION

Cultivation of common edible mushrooms typically involves four fundamental steps: 1) preparation and pasteurization of an organic growth substrate; 2) inoculation of the growth substrate with spores or mycelium of the mushroom species to be grown; 3) establishment and maintenance of conditions required for mycelial colonization of the growth substrate, and, 4) establishment and maintenance of conditions necessary for fruiting body emergence and maturation. Unfortunately, the presence of various common microbial species can be deleterious to the growth of mushrooms. Examples of deleterious micro-organisms include species of *Cladosporium, Penicillium*, and *Aspergillus* genera of fungi, as well as numerous species of bacteria, yeasts, algae and viruses. These micro-organisms and/or their spores are ubiquitous in indoor and outdoor environments. Conventional systems for growing mushrooms lack an aseptic growing environment and are therefore susceptible to such invasive and deleterious micro-organisms. Moreover, maintaining optimal conditions of moisture, temperature, light, and $CO_2$ content required for successful mushroom growth can be difficult to consistently maintain in conventional apparatus and systems over a growth cycle of several weeks.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

Embodiments of the present inventive concepts provide mushroom growing apparatus, systems and methods which establish and maintain all the conditions required for successful mushroom cultivation in a convenient, foolproof and automated manner. Embodiments of the present inventive concepts allow a mushroom grower to cultivate certain mushroom species which would be otherwise impossible to grow in a conventional artificial (i.e., non-natural) environment. Embodiments of the present inventive concepts are scalable in size, allowing the home mushroom grower to choose the desired production volume. Additionally, the herein described mushroom growing apparatus, systems and methods facilitate mushroom preservation immediately after harvest through lyophilization.

According to some embodiments of the present inventive concepts, a mushroom growing apparatus includes a tray having a bottom wall and a circumferential side wall upwardly extending from the bottom wall to define an interior cavity. A growth substrate is supported within the interior cavity, and the growth substrate is configured to be inoculated with inoculum comprising mycelium or spores. A removable barrier material is secured to the tray and overlies the interior cavity and aseptically seals the interior cavity from an external environment. The tray includes at least one input port through which material can be provided into the interior cavity, and at least one output port through which material can be removed from the interior cavity. The at least one input port and the at least one output port are configured to impede microbiological incursion into the interior cavity. At least one sensor may be disposed within the cavity, providing information regarding the environment within the interior cavity.

The mushroom growing apparatus ensures the sterility of the mushroom growing environment until inoculation with spores or mycelium and thereafter maintains aseptic conditions until the mushrooms are no longer susceptible to destructive competition from competing micro-organisms. The removable barrier together with the tray define an aseptic cavity. Sterile materials required for mushroom growth are introduced into the growth substrate via the at least one input port. Excess materials and/or materials containing waste products of mushroom growth are removed from the growth substrate via the at least one output port.

According to some embodiments of the present inventive concepts, an environmental control apparatus includes a housing and at least one growth chamber located within the housing. Each growth chamber is configured to receive a respective mushroom growing apparatus therein. Each mushroom growing apparatus includes a growth substrate configured to be inoculated with inoculum comprising mycelium or spores. An access door is movably secured to the housing and is movable between an open position and a closed position. In some embodiments, the access door may be configured to seal the one or more growth chambers from an external environment when in the closed position. The environmental control apparatus is configured to maintain prescribed environmental conditions within a mushroom growing apparatus by providing material and information inputs to, and receiving material and information outputs from, the mushroom growing apparatus. A computer program residing in a memory, and that is executable by a digital processor, controls the components which exchange material and information with the mushroom growing apparatus. A graphical user interface (GUI) is configured to provide information to, and receive information from, a system operator of the environmental control apparatus.

According to some embodiments of the present inventive concepts, a mushroom growing system includes an environmental control apparatus having a housing and at least one growth chamber located within the housing, and a respective mushroom growing apparatus configured to be inserted within each growth chamber. Each mushroom growing apparatus includes a tray having a bottom wall and a circumferential side wall upwardly extending from the bottom wall to define an interior cavity. The tray includes at least one input port through which material can be provided into the interior cavity, and at least one output port through which material can be removed from the interior cavity. The at least one input port and the at least one output port are configured to impede microbiological incursion into the interior cavity. A growth substrate is supported within the interior cavity, and the growth substrate is configured to be inoculated with inoculum comprising mycelium or spores. A removable barrier material is secured to the tray and overlies and seals the interior cavity. An antimicrobial air filter is configured to filter air provided into the interior cavity via the at least one input port. An antimicrobial water filter is configured to filter water provided into the interior cavity via the at least one input port.

Each growth chamber includes at least one input connector that is configured to matingly receive the at least one input port of a respective mushroom growing apparatus, and at least one output connector that is configured to matingly receive the at least one output port of the respective mushroom growing apparatus when the mushroom growing apparatus is inserted within the growth chamber. Each growth chamber is accessible via an opening, and an access door of the environmental control apparatus, which is movable between open and closed positions.

The system further includes an air system, water system, thermal regulation system and illumination system. The air system is configured to provide fresh air into, and remove waste air from, each mushroom growing apparatus contained within a respective growth chamber. The water system is configured to provide fresh water into, and remove waste water from, each mushroom growing apparatus contained within a respective growth chamber. The thermal regulation system is configured to independently maintain an interior temperature of each respective mushroom growing apparatus within a desired range. The illumination system is configured to maintain the illumination of the mushroom growing apparatus within a desired range of duration, intensity, and wavelength. A lyophilization appliance may be housed within the environmental control apparatus and is configured to freeze-dry mushrooms harvested at the end of a growth cycle.

According to some embodiments of the present inventive concepts, a method of growing mushrooms includes providing a mushroom growing apparatus having an interior cavity, a growth substrate supported within the interior cavity, and a barrier material sealing the interior cavity from an external environment; connecting the mushroom growing apparatus to an air system, a water system, a thermal regulation system, and an illumination system; inoculating the growth substrate by aseptically injecting inoculum into the growth substrate via an injection port in the mushroom growing apparatus; and controlling the air system, the water system, the thermal regulation system, and the illumination system so as to maintain a prescribed environment within the interior cavity for a predetermined period of time. The method also includes the reading of information from memory associated with a system controller, from an external device via wireless link, or from a device associated with the mushroom growing apparatus, and/or the exchange of information with the system operator, which informs a computer program that controls the system. The growing method may further include the lyophilization of harvested mushrooms.

According to some embodiments of the present inventive concepts, a method of growing mushrooms includes providing a mushroom growing apparatus comprising an interior cavity, an inoculated growth substrate supported within the interior cavity, and a barrier material sealing the interior cavity from an external environment; connecting the mushroom growing apparatus to an air system, a water system, a thermal regulation system, and an illumination system; and controlling the air system, the water system, the thermal regulation system, and the illumination system so as to maintain a prescribed environment within the interior cavity for a predetermined period of time.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

DETAILED DESCRIPTION

Figure 1:
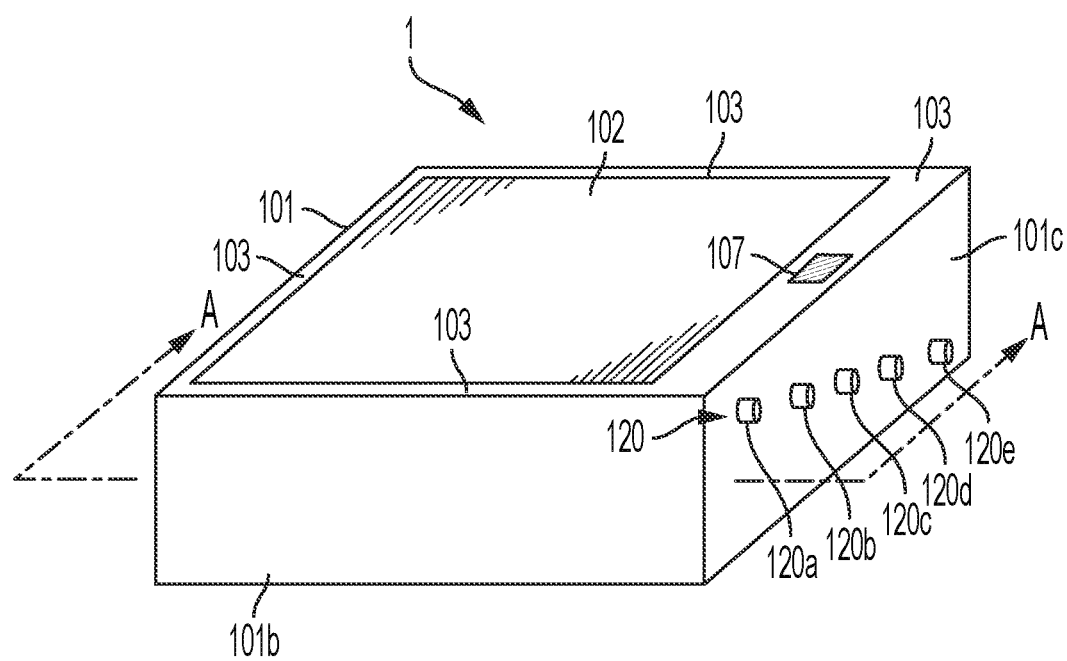
FIG. 1 is a top perspective view of a mushroom growing apparatus, according to some embodiments of the present inventive concepts.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.," which derives from the Latin phrase "exempli gratia," may be used to introduce or specify a general example or examples of a previously mentioned item, and is not intended to be limiting of such item. The common abbreviation "i.e.," which derives from the Latin phrase "id est," may be used to specify a particular item from a more general recitation.

It will be understood that although the terms first, second, third, etc., may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

The terms "about" and "approximately", as used herein with respect to a value or number, means that the value or number can vary by +/−twenty percent (20%).

Referring now to the figures, mushroom growing apparatus, systems and methods will be described. According to embodiments of the inventive concepts, a mushroom growing system 3 (FIG. 8) comprises two components: at least one single-use mushroom growing apparatus 1, and a durable, multi-use environmental control apparatus 2.

Figure 2:
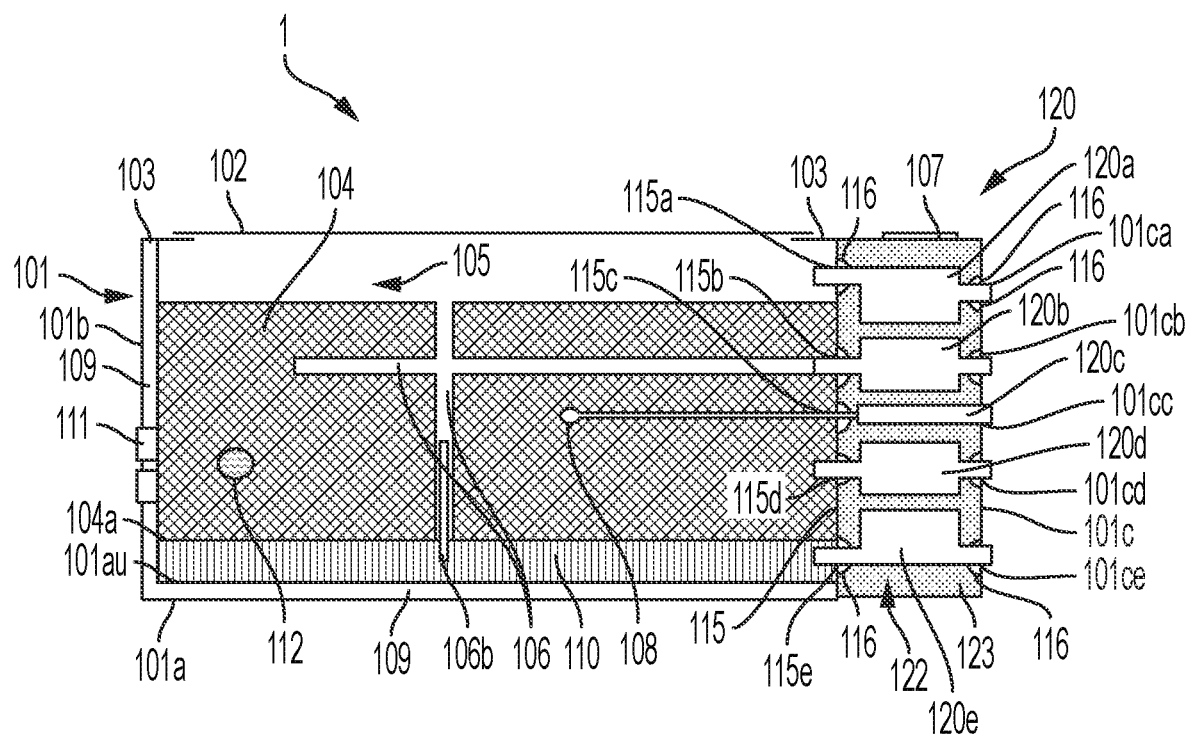
FIG. 2 is a cross-sectional view of the mushroom growing apparatus of FIG. 1 taken along line A-A and illustrating a non-expandable barrier.

Referring to FIGS. 1 and 2, the mushroom growing apparatus 1 includes a tray 101 having a bottom wall 101a and circumferential side walls 101b and 101c upwardly extending from the bottom wall 101a to define an interior cavity 105, as illustrated. The tray 101 is a structurally rigid, three-dimensional enclosure that is impermeable to microbial penetration. A barrier material 102 is secured to a lip 103 on the upper edge of the tray 101 in the illustrated embodiment. The barrier material 102 overlies the interior cavity 105 and aseptically seals the interior cavity 105 from an external environment. In some embodiments, the barrier material 102 has one or more of the following characteristics: it is transparent, it is translucent, it is multi-layered, it is thermally insulating, it is thermally reflective, it is hydrophobic, it is expandable.

In some embodiments, as illustrated in FIGS. 1 and 2, the mushroom growing apparatus 1 features a barrier 102 comprising a non-expandable material which is manually removed by a system operator after the emergence of fruiting bodies from the upper surface of the growth substrate 104.

Figure 4:
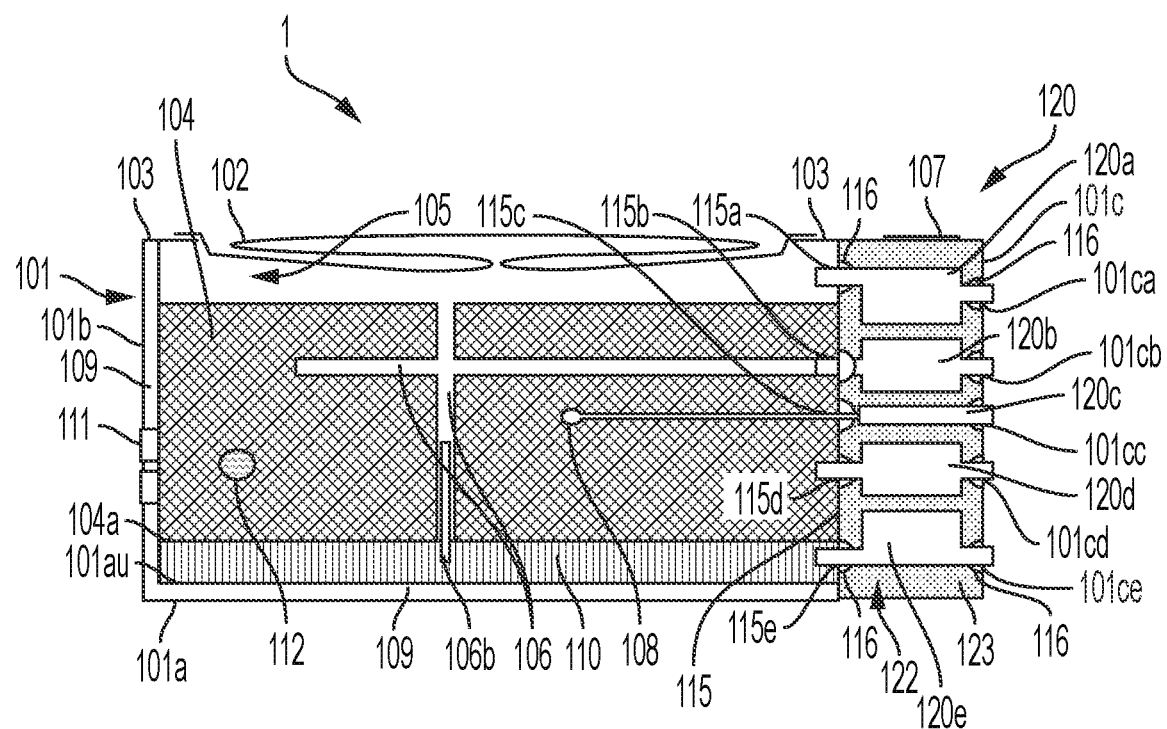
FIG. 4 illustrates the mushroom growing apparatus of FIG. 1 taken along line A-A but with the non-expandable barrier replaced with an expandable barrier. The expandable barrier is depicted in an unexpanded condition in FIG. 4.
Figure 5:
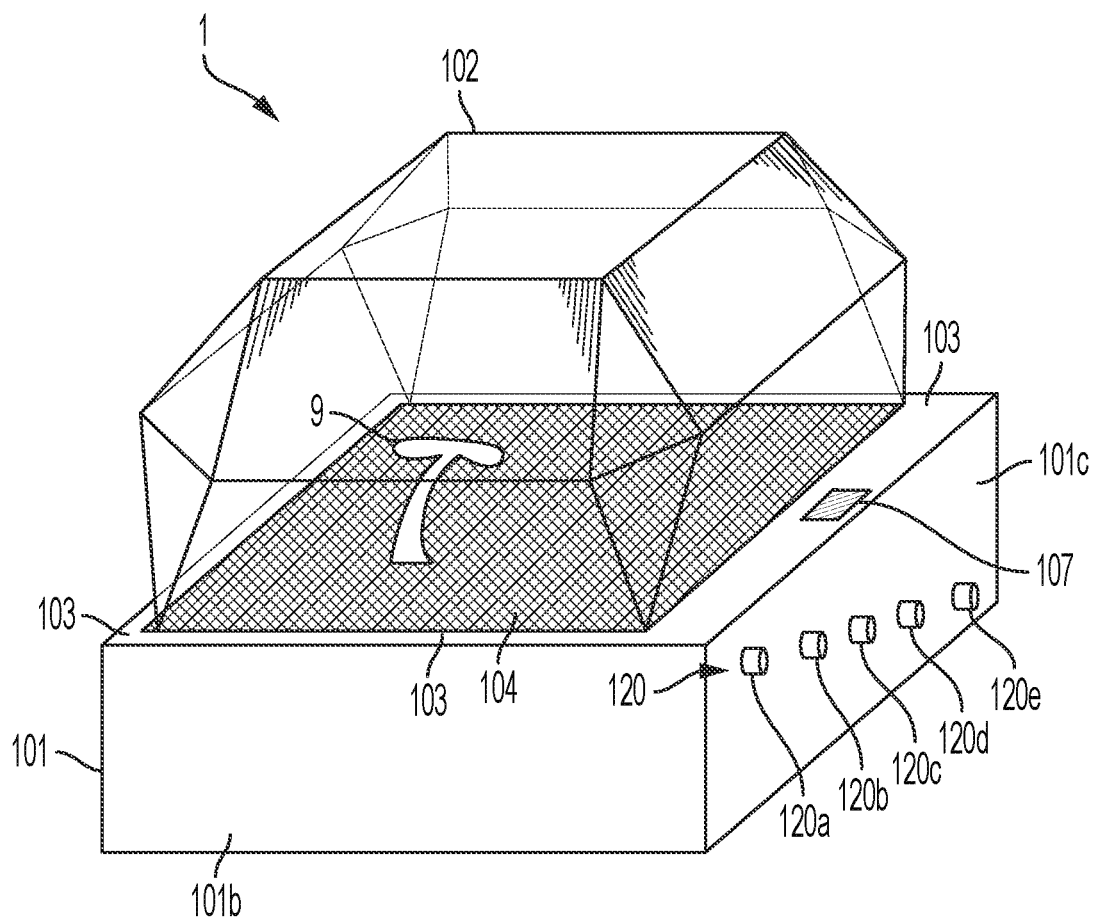
FIG. 5 is a top perspective view of the mushroom growing apparatus of FIG. 4 with the expandable barrier depicted in an expanded condition.

In some embodiments, as illustrated in FIGS. 4 and 5, the mushroom growing apparatus 1 features an expandable barrier 102 which comprises a flexible material folded into a substantially flat configuration (FIG. 4) and which unfolds upon air pressurization of the interior cavity 105 to acquire a three-dimensional configuration (FIG. 5) and to expand the volume of the interior cavity 105 beyond the upper surface of the tray 101 to provide sufficient space to accommodate the growth of mushroom fruiting bodies 9.

A mushroom growth substrate 104 is supported within the interior cavity 105 of the tray 101 and is configured to be inoculated with inoculum 112 comprising mycelium or spores. The mushroom growth substrate 104 comprises particles of organic matter compressed to a desired degree of particle contact but not to the degree wherein air circulation between the particles is prevented, thereby ensuring that the mushroom growth substrate is permeable to airflow.

In some embodiments, the tray 101 and/or the barrier material 102 includes at least one sterile, self-healing injection port 111 (FIGS. 2 and 4) through which inoculum 112 can be aseptically injected into the growth substrate 104. The injection port 111 is sealed in place with a material configured to impede microbiological incursion into the interior cavity 105.

In some embodiments, the tray 101 includes a bar code 107 and/or an RFID device 107 that contains information about the growth substrate 104 composition and species of mushroom inoculum 112 in the growth substrate 104, the latter if the mushroom growing apparatus 1 has been pre-inoculated by a manufacturer. In some embodiments, the tray bottom wall 101a and/or the tray side wall 101b may be formed from spaced apart first and second walls. An insulating and/or structurally stabilizing material 109 may be disposed between the spaced apart walls. However, embodiments of the present invention do not require spaced apart walls. The tray bottom wall 101a and/or the tray side wall 101b may be a single wall in some embodiments.

In some embodiments, a fluid-permeable matrix layer 110 is disposed between the bottom surface 104a of the growth substrate 104 and the upper surface of the bottom wall 101au of the tray 101. The matrix layer 110 is configured to allow water and air to circulate therethrough. The fluid permeable material of the matrix layer 110 induces the capillary transport of fluids into the growth substrate 104 above the matrix layer 110.

Figure 3:
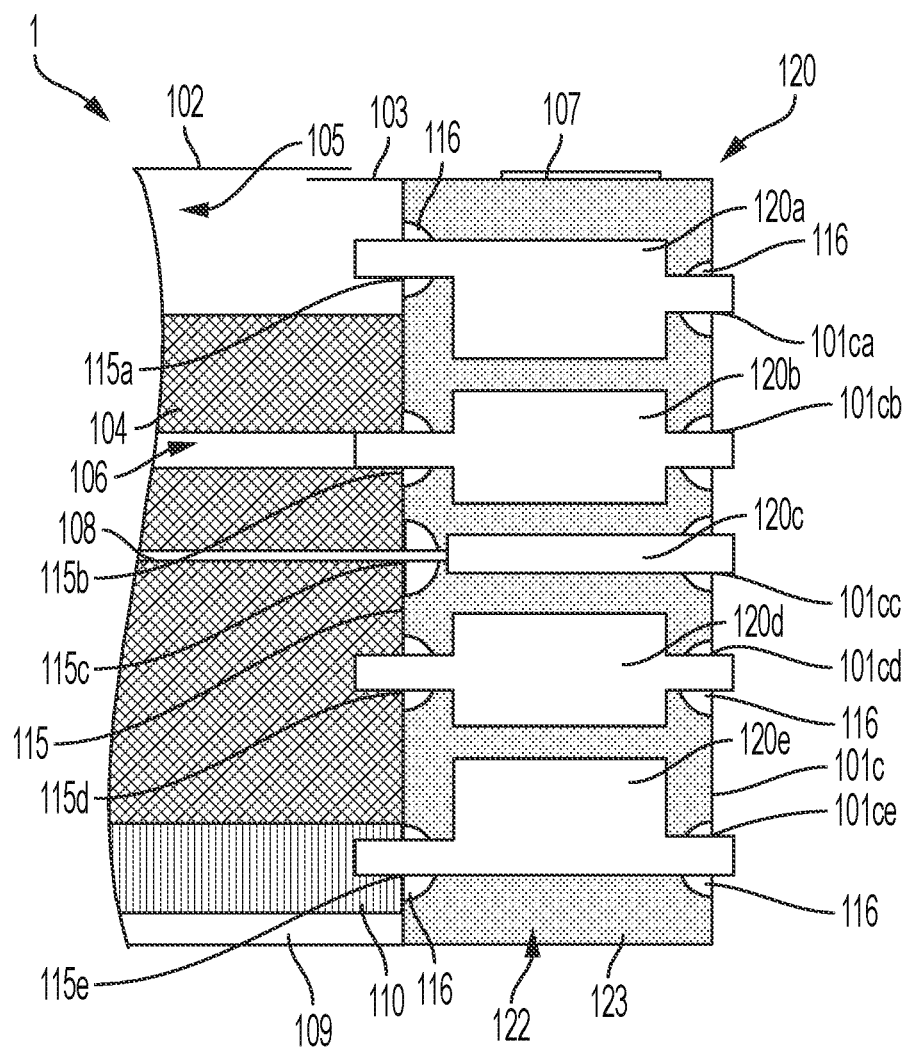
FIG. 3 is a cross-sectional view of the mushroom growing apparatus of FIG. 1 taken along line A-A and illustrating in greater detail the input and output ports.

As illustrated in FIGS. 2, 3 and 4, the tray 101 includes a cavity 122 that houses input ports and output ports, collectively identified as 120. The cavity 122 is partitioned from the interior cavity 105 of the tray 101 by a partition 115. In the embodiments illustrated in FIGS. 1-5, a plurality of ports 120a, 120b, 120c, 120d, 120e are provided in the cavity 122 of tray 101. Some of these may be input ports through which material can be provided into the interior cavity 105 of the tray, and some of these may be output ports through which material can be removed from the interior cavity 105 of the tray 101. Also, some of these may be input ports through which electromagnetic impulses can be provided to sensors 108 within cavity 105 of the tray, and some of these may be output ports through which electromagnetic impulses can be received from sensors 108 within the interior cavity 105 of the tray 101. In some embodiments, one or more of the illustrated ports 120a, 120b, 120c, 120d, 120e may serve the function of both an input port and an output port.

Each of the ports 120a, 120b, 120c, 120d, 120e communicate with the growth chamber 210 of the environmental control apparatus 2 through respective openings 101ca, 101cb, 101cc, 101cd, 101ce in the tray wall 101c. The openings 101ca, 101cb, 101cc, 101cd, 101ce are configured to impede microbiological incursion from an external environment into cavity 122 by means of sealant material 116 disposed where the input and output ports are in physical contact with the tray wall 101c. In some embodiments, this sealant may include an antimicrobial component.

Each of the ports 120a, 120b, 120c, 120d, 120e communicate with the tray interior cavity 105 through respective openings 115a, 115b, 115c, 115d, 115e in the partition 115. The openings 115a, 115b, 115c, 115d, 115e are configured to impede microbiological incursion from cavity 122 into the interior cavity 105 by means of sealant material 116 disposed where the input and output ports are in physical contact with the partition 115. In some embodiments, this sealant may include an antimicrobial component.

In some embodiments, the input ports and output ports, collectively identified as 120, are embedded directly in the growth substrate 104, rather than within a cavity 122 which is partitioned from the growth substrate 104 by partition 115. In this embodiment, the input ports and output ports are in direct contact with the growth substrate 104.

In the illustrated embodiment, port 120e is positioned on the tray 101 such that air/water may be introduced directly into and removed directly from the matrix layer 110 via opening 115e. Port 120d is positioned on the tray 101 such that air/water may be introduced directly into and removed directly from the growth substrate 104 via opening 115d. Port 120b is positioned on the tray 101 such that air/water may be introduced directly into and removed directly from channel 106 via opening 115b. Port 120a is positioned on the tray 101 such that air/water may be introduced directly into and removed directly from the interior cavity 105 above the growth substrate 104 via opening 115a.

Port 120c is associated with one or more sensors 108 that are positioned within the growth substrate 104. The sensor(s) 108 is configured to monitor the condition of the growth substrate 104 as well as the mycelial growth state and/or rate through measurement of one or more of the following parameters: electrical conductivity, electromagnetic emission, absorption and reflection, temperature, humidity, oxygen partial pressure, and carbon dioxide partial pressure. In some embodiments, a sensor 108 disposed on or within the surface of the growth substrate 104 is configured to measure illumination intensity and wavelength. The sensor(s) 108 provides this information to one or more computer programs running on the system controller 204 (FIG. 9) of the environmental control apparatus 2 via opening 115c, the port 120c, the connector 220c, and the conductor 228. The system controller 204 utilizes the signals from the sensor(s) 108 to control the air system, water system, thermal regulation system, and illumination system.

In some embodiments, the growth substrate 104 includes one or more channels 106 in fluid communication with one or more of the input/output ports 120. In the illustrated embodiment, two channels 106 are in fluid communication with port 120b. Each channel 106 is configured to allow air and/or water to flow into the growth substrate 104 and interior cavity 105 via port 120b and opening 115b, and to allow air (or other gases) and/or waste water to flow out of the growth substrate 104 and interior cavity 105 via opening 115b and port 120b. The channels 106 may comprise tubes formed from one or more of the following materials: plastic polymer, metal, biodegradable organic polymer, organic polymer comprising nutrients and/or agents configured to facilitate mycelium and/or fruiting body growth. Perforations of the tubular walls facilitate the flow of material into and out of the tubes. In some embodiments, one or more of the channels 106 may include a wick 106b configured to transport water into the growth substrate 104.

In some embodiments, a filler material 123, such as paraffin wax, sealing wax, potting compound, an open or closed cell polymeric foam, a colloidal material, etc., surrounds or contacts at least a portion of the illustrated ports 120a, 120b, 120c, 120d, 120e. This filler material 123 serves to stabilize and protect the ports 120a, 120b, 120c, 120d, 120e against physical shock as might be experienced during shipping, and to impede microbial incursion into the interior cavity 105.

It is to be appreciated that a mushroom growing apparatus 101 may have various numbers and configurations of ports 120. Embodiments of the present invention are not limited to the illustrated ports 120a, 120b, 120c, 120d, 120e and their configuration.

One or more of the illustrated ports 120a, 120b, 120c, 120d, 120e may include an antimicrobial air filter component 125 (FIG. 11) configured to filter air provided into the interior cavity 105 and/or an antimicrobial water filter 125 configured to filter water provided into the interior cavity 105.

Additionally, one or more of the illustrated ports 120a, 120b, 120c, 120d, 120e may include a component 126 that is configured to modify one or more of the following characteristics of air introduced into the interior cavity 105: temperature, microbial content, humidity, carbon dioxide content, volatile organic compound content, dust particle content. The microbial content modifying component may comprise a micropore filter material, a matrix comprising antimicrobial agents, an ultraviolet light source or combinations thereof. The carbon dioxide modification component may include a carbon dioxide sequestering material such as lithium hydroxide. The soluble organic compound modification component may comprise activated carbon or other adsorption material or combinations thereof. The dust particle modification component may comprise a porous particle filtration material or an electrostatic filter or both.

Furthermore, one or more of the illustrated ports 120a, 120b, 120c, 120d, 120e may include a component 126 (FIG. 11) that is configured to modify one or more of the following characteristics of water introduced into the interior cavity 105: temperature, mineral content, soluble organic compound content, pH. The antimicrobial content modifying component may comprise a micropore filter material, a matrix comprising antimicrobial agents, an ultraviolet light source or combinations thereof. The mineral content modifying component may comprise an ion exchange material. The soluble organic compound modification component may comprise an activated carbon or other adsorption material or combinations thereof. The pH modifying component may include buffering salts or an ion exchange material or combinations thereof.

In some embodiments, the barrier material 102 and the various ports 120a, 120b, 120c, 120d, 120e are configured to maintain positive atmospheric pressure within the interior cavity 105 as compared to the atmosphere external to the interior cavity. This pressure gradient impedes microbiological incursion through a potentially imperfect seal between the tray 101 and the barrier 102, the junction of any port 120a, 120b, 120c, 120d, 120e and the wall 101c of the tray 101 through openings 101ca, 101cb, 101cc, 101cd, 101ce and partition 115 through openings 115a, 115b, 115c, 115d, 115e, and the junction of the self-healing inoculum injection port 111 and the wall 101b of the tray 101 or the barrier 102.

The environmental control apparatus 2 is now described referring to FIGS. 6-12. The environmental control apparatus 2 includes a housing 201 that defines an interior space. In some embodiments, the housing may be a solid, continuous material that is impermeable to liquids and gasses. One or more portions of the housing 201 may be opaque, translucent, transparent, and/or insulating. In some embodiments, the housing 201 may be a discontinuous grid or lattice structure which permits air flow through the housing.

Figure 6:
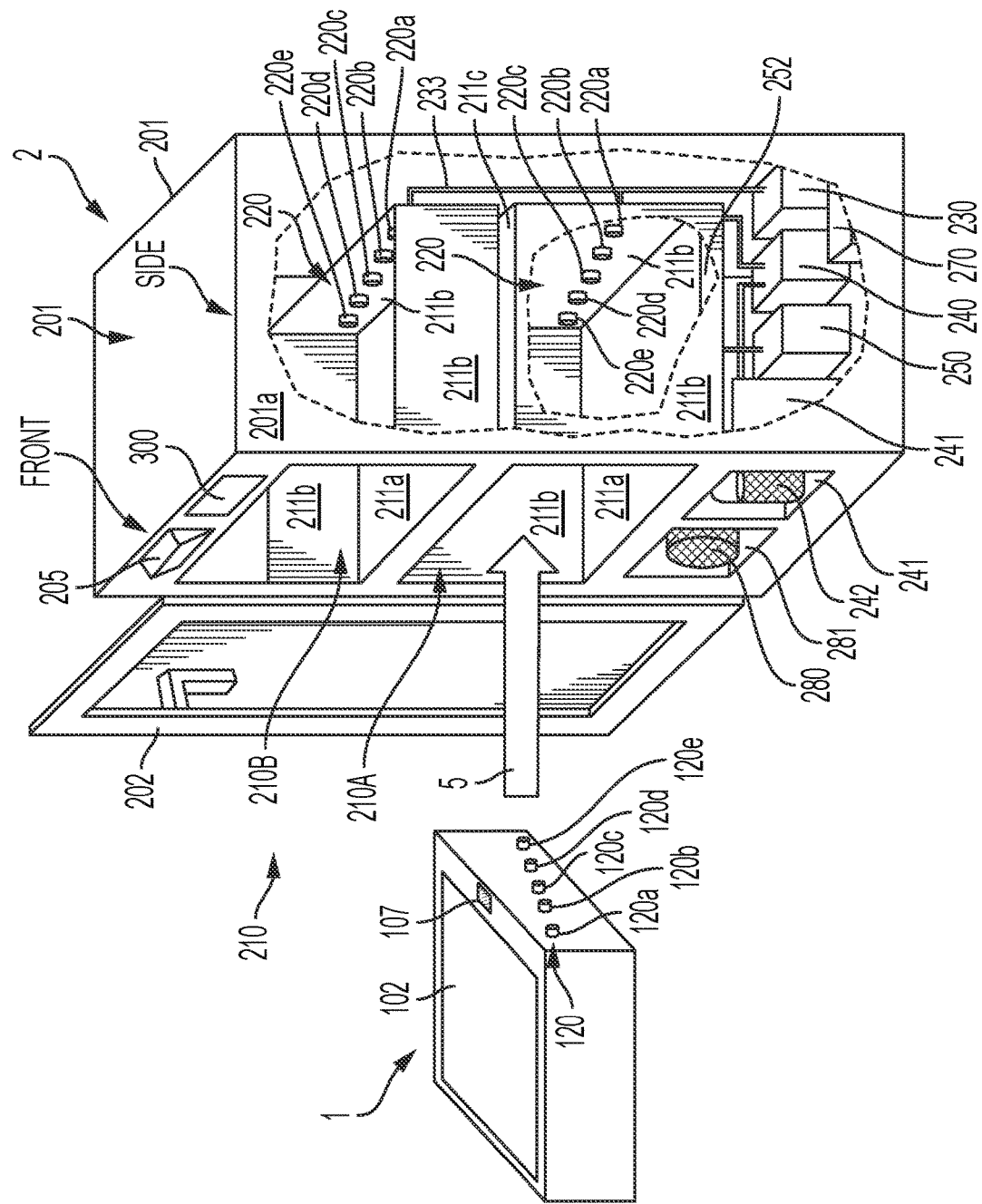
FIG. 6 is perspective, cutaway view of an environmental control apparatus, according to some embodiments of the present inventive concepts. A mushroom growing apparatus is illustrated being installed into a growth chamber within the environmental control apparatus.
Figure 7:
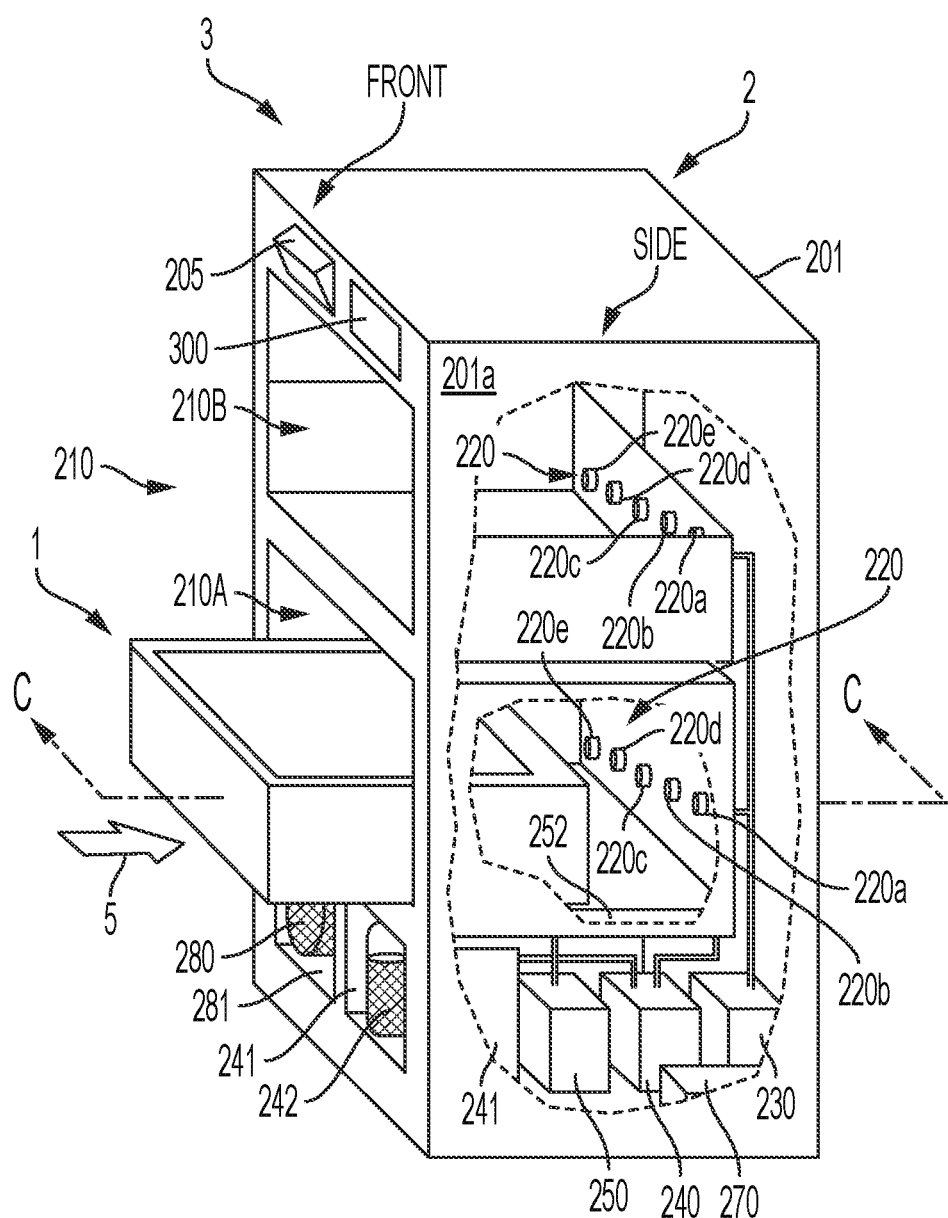
FIG. 7 is perspective cutaway view of the environmental control apparatus of FIG. 6, illustrating a mushroom growing apparatus partially installed into a growth chamber within the environmental control apparatus.
Figure 8:
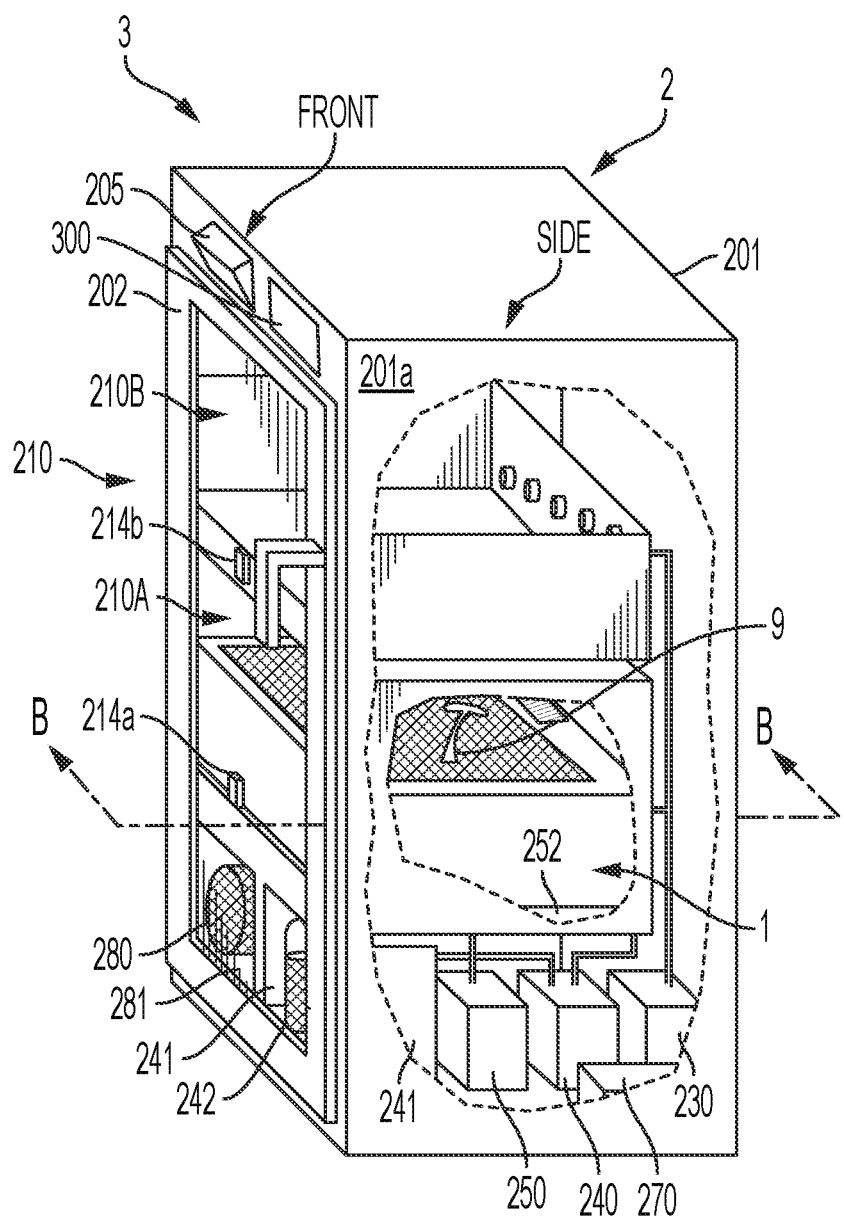
FIG. 8 illustrates the environmental control apparatus of FIG. 6 with a mushroom growing apparatus positioned within a growth chamber and with the access door in the closed position. The barrier of the mushroom growing apparatus has been removed and a mushroom fruiting body has emerged from the upper surface of the growth substrate.
Figure 9:
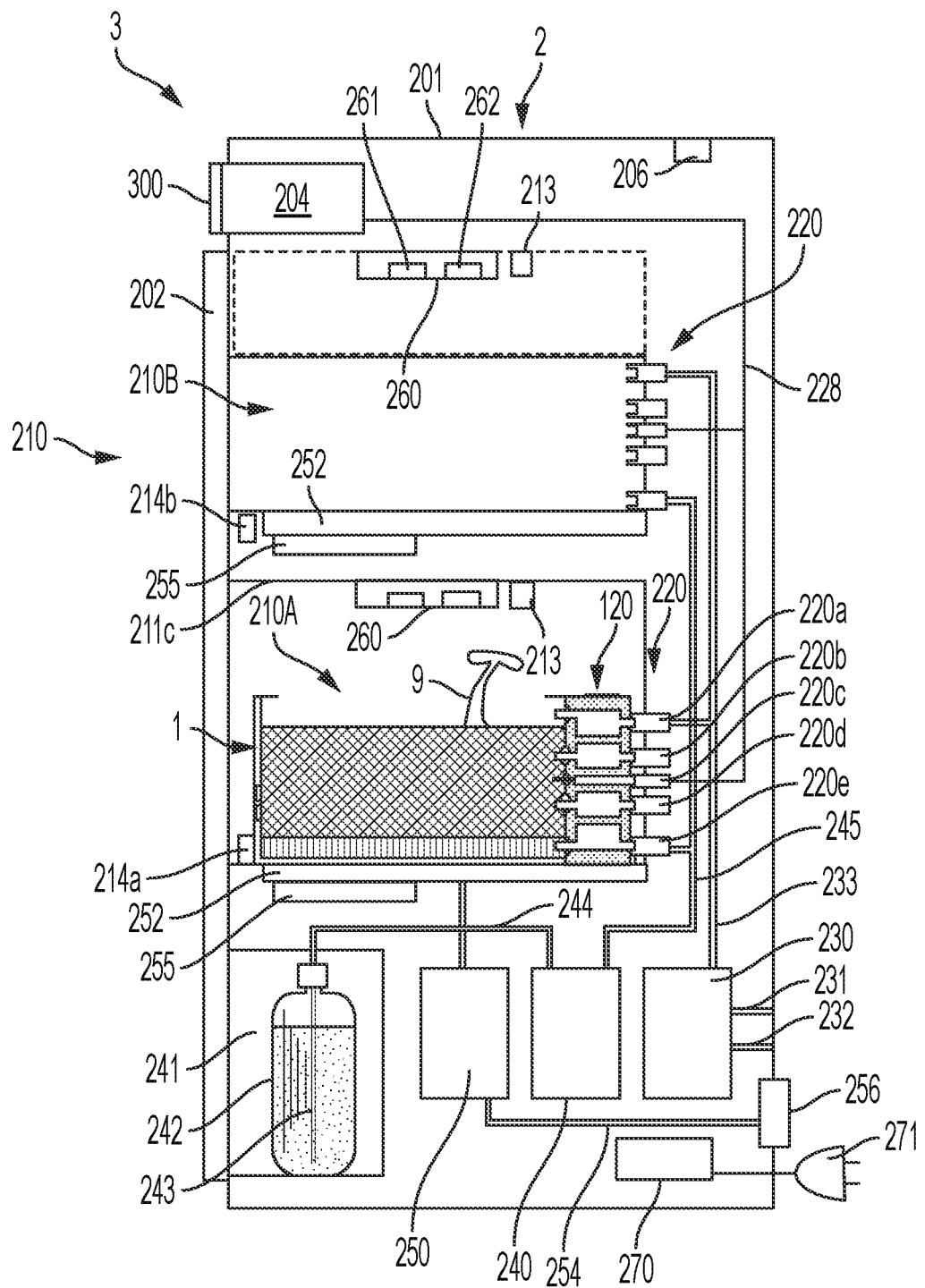
FIG. 9 is a cross-sectional view of the environmental control apparatus of FIG. 8 taken along line B-B.

One or more growth chambers 210 are located within the housing 201, and each growth chamber is configured to receive a respective mushroom growing apparatus 1 therein. In the illustrated embodiment, the housing 201 includes two growth chambers 210A, 210B. FIGS. 6, 7, 10 and 11 illustrate a mushroom growing apparatus 1 being inserted into the growth chamber 210A. FIGS. 8 and 9 illustrate the mushroom growing apparatus 1 after insertion into the growth chamber 210A, and towards the end of the growth cycle when the barrier 102 has been removed and fruiting body 9 is mature.

An access door 202 (FIGS. 6, 8, and 9) is movably secured to the housing 201 and is movable between open and closed positions. (The access door 202 is not illustrated in FIG. 7 for ease of illustration of other components of the environmental control apparatus 2.) In some embodiments, the access door 202 may be configured to seal the one or more growth chambers 210 from an environment external to the environmental control apparatus 2 when in the closed position. In some embodiments, the access door 202 may be a solid, continuous material that is impermeable to liquids and gasses. In some embodiments, one or more portions of the access door 202 may be opaque. In some embodiments, one or more portions of the access door 202 may be translucent or transparent. In some embodiments, the access door 202 may have a double-wall configuration and may also be insulated. In some embodiments, the access door 202 is not configured to seal the one or more growth chambers 210 from an environment and may be comprised of a discontinuous grid or lattice structure which permits air flow through the access door 202.

In the illustrated embodiment, the openings of the growth chambers 210 are on the front side of the housing 201 of the environmental control apparatus 2. In FIGS. 6, 7 and 8, the housing 201 side panel 201a is partially cut away to reveal embodiments of the growth chambers 210A, 210B. The growth chamber 210A is fully enclosed by a bottom wall 211a, three side walls 211b, an upper wall 211c, and the access door 202 when the access door 202 is in the closed position. The growth chamber 210B is partially enclosed by a bottom wall 211a, and three side walls 211b. The three side walls 211b of growth chamber 210B may be of a height equal to, greater, or lesser than the height of the mushroom growing apparatus 1. In FIGS. 6, 7, and 8, one side wall 211b of growth chamber 210A is partially cut away to reveal internal features.

Embodiments of the present inventive concepts are not limited to the illustrated configuration of the environmental control apparatus 2 and the number and arrangement of growth chambers 210. Various numbers of growth chambers 210, including a single growth chamber as well as more than two growth chambers, may be utilized. Moreover, the growth chambers may be arranged horizontally. In addition, in some embodiments, an environmental control apparatus 2 may have a plurality of growth chambers, with each growth chamber configured to support a mushroom growing apparatus 1 at different individual stages of a mushroom growth cycle.

Each growth chamber 210A, 210B in the illustrated environmental control apparatus 2 is configured to contain and operationally connect a respective mushroom growing apparatus 1 to an air system 230, water system 240, thermal regulation system 250, and illumination system 260 housed within the environmental control apparatus 2. The air system 230, water system 240, thermal regulation system 250, and illumination system 260 are governed by the system controller 204 so as to maintain a prescribed environment within a mushroom growing apparatus 1 within a respective growth chamber 210. System controller 204 has one or more processors and includes memory in communication with the one or more processors, and the memory contains one or more computer programs utilized by the processor(s) to control the air system 230, the water system 240, the thermal regulation system 250, and the illumination system 260.

In the illustrated embodiment, the environmental control apparatus 2 includes an air system 230 that is configured to provide fresh air into a mushroom growing apparatus 1 contained within a respective growth chamber 210A, 210B via one or more of the growth chamber input/output connectors 220a, 220b, 220d, 220e, and to remove waste air from the mushroom growing apparatus via one or more of the growth chamber input/output connectors 220a, 220b, 220d, 220e. Waste air is defined as air which has passed through the growth substrate 104 of a mushroom growing apparatus 1 and/or has a certain carbon dioxide to oxygen partial pressure ratio. The one or more input/output connectors 220a, 220b, 220d, 220e connected to the air system 230 are also configured to regulate air pressure within the interior cavity 105 of a mushroom growing apparatus 1.

Referring to FIG. 9, a pump within the air supply system 230 draws fresh air from the atmosphere external to the environmental control apparatus housing 201 through an intake conduit 231 and discharges waste air to the ambient atmosphere through an exhaust conduit 232. In the illustrated embodiment, air is supplied to the mushroom growing apparatus via the conduit 233, and input/output connector 220a when matingly connected to mushroom growing apparatus port 120a. However, air may be supplied into a mushroom growing apparatus 1 via other connectors/ports.

In the illustrated embodiment, the environmental control apparatus 2 also includes a water system 240 that is configured to provide fresh water into the mushroom growing apparatus 1 contained within a respective growth chamber 210A, 210B via one or more of the growth chamber input/ output connectors 220*a*, 220*b*, 220*d*, 220*e*, and to remove waste water from the mushroom growing apparatus via one or more of the growth chamber input/output connectors 220*a*, 220*b*, 220*d*, 220*e*. Waste water is defined as water within an interior cavity 105 of a mushroom growing apparatus 1 which is not required to support mushroom growth and/or contains certain metabolic waste products. In the illustrated embodiment, mushroom growing apparatus port 120*e* is located at the bottom of the interior cavity 105. Waste water is removed from the mushroom growing apparatus via port 120*e* and respective growth chamber connector 220*e* matingly connected thereto.

As illustrated in FIG. 9, the housing access door 202 permits access to cavity 241 which is configured to store one or more liquid containers 242 that provide a reservoir of water and/or aqueous solutions for the water supply system 240. In other embodiments, cavity 221 may have its own access door. The containers 242 may be transparent to permit visual determination of water levels within the containers. Multiple containers 242 with different components in aqueous solution may be disposed within the cavity 241 simultaneously, and the water or aqueous solution appropriate to the stage in the growth cycle may be distributed to the water supply system 240 as governed by the system controller 204. The water and/or aqueous solutions may be supplied by a manufacturer or the operator.

Water and/or aqueous solutions are withdrawn from container 242 through a drop tube 243 and a conduit 244, as illustrated in FIG. 9. The water supply system 240 supplies water to the growth chamber 210 of a mushroom growing apparatus 1 via the conduit 245. In the illustrated embodiment, water is supplied via input/output connector 220*e* when matingly connected to mushroom growing apparatus port 120*e*. However, water may be supplied into a mushroom growing apparatus 1 via other connectors/ports. A warning light 309, audible alarm 310, or warning message 304 may be displayed on the GUI 300 (FIG. 12) when the liquid in container(s) 242 is nearing depletion.

In the illustrated embodiment, the environmental control apparatus 2 also includes a thermal regulation system 250 configured to independently maintain an interior temperature of a mushroom growing apparatus 1 contained within a respective growth chamber 210A, 210B within a desired range. The thermal regulating system 250 is configured to heat or cool the interior cavity 105 of a mushroom growing apparatus 1 via thermal communication with heat exchanger 252 disposed on the bottom surface of the illustrated growth chambers 210A and 210B (FIGS. 6-9). The temperature of heat exchanger 252 is modulated by a thermal transfer medium including air and water which is heated or cooled by components of the thermal regulation system 250 including, but not limited to, a compression-expansion cycle heat pump, an electrical resistance heater, a Peltier device or cascade of multiple Peltier devices, and combinations thereof. In some embodiments, the temperature of heat exchanger 252 is modulated directly by a Peltier device 255 or cascade of multiple Peltier device components operatively associated with thermal regulation system 250. In some embodiments, the temperature of interior cavity 105 is further controlled by modulating the temperature of air and water inputs into the interior cavity.

The heating and cooling device components of thermal regulating system 250 may also provide thermal resources to systems (not depicted) which modulate the temperature of one or more surfaces of one or more of the following in order to reduce moisture condensation which may impede the viewing and/or illumination of the surface of the growth substrate 104: the housing door 202, the barrier 102, a lens of a camera 213, or any other surface. The heating and cooling device components of thermal regulating system 250 may also provide thermal resources to light sources 261 within the illumination system 260 via heat exchanger 262. Additionally, the heating and cooling device components of thermal regulating system 250 provide thermal resources to lyophilizer 280. The thermal regulating system 250 exchanges heat with the ambient atmosphere through an external heat exchanger 256 operationally connected to the thermal regulating system 250 by conductor(s) 254 (FIG. 9).

In the illustrated embodiment, the environmental control apparatus 2 also includes an illumination system 260 configured to independently illuminate the mushroom growing apparatus 1 contained within a respective growth chamber 210A, 210B. The illumination may be provided for one or more of the following purposes: mushroom growth modulation, reflective imaging, fluorescence imaging. Illumination system 260 comprises at least one light source 261 (FIGS. 9 and 10) including but not limited to: LED, incandescent, fluorescent, neon, halogen, metal vapor, or combinations thereof as required to provide the desired intensity and wavelengths of light. The on/off times, on/off intervals, wavelength and intensity of the light source 261 are governed by the system controller 204. The illumination system may also comprise a heat exchanger 262 to modulate the temperature of the light source.

In the illustrated embodiment, a camera 213 (FIGS. 9, 10) is positioned within each growth chamber 210A, 210B and above a respective mushroom growing apparatus 1. The camera 213 is configured to capture images of the mushroom growing apparatus 1 and the growth substrate 104 therein at time points manually selected by an operator and/or at intervals determined by the system controller 204. The camera 213 is part of an imaging system configured to monitor the upper surface condition of the growth substrate 104, mycelial growth, and fruiting body development. The imaging system also includes a processor and memory (both within the system controller 204). The memory stores one or more image processing algorithms, and the processor is configured to acquire images captured by the camera 213 and process the images using the one or more image processing algorithms.

In one embodiment, the camera 213 is configured to capture infra-red electromagnetic emission from the upper surface of a growth substrate 104 to detect fruiting bodies 9 (FIGS. 5, 8 and 9) which, due to metabolic heat generation, are warmer than the surrounding substrate. This temperature contrast is enhanced by the active fresh air perfusion through the growth substrate 104 caused by the air system 230.

In the illustrated embodiment, each growth chamber 210A, 210B includes a respective plurality of input/output connectors 220*a*, 220*b*, 220*c*, 220*d*, 220*e* (collectively referred to herein as 220) that are configured to matingly receive the respective input/output ports 120*a*, 120*b*, 120*c*, 120*d*, 120*e* of a mushroom growth apparatus 1 when the mushroom growing apparatus 1 is inserted within the growth chamber. In the illustrated embodiment, information in the form of electrical, electronic, digital and/or optical signals is conveyed between the mushroom growing apparatus 1 port 120*c* and the environmental control apparatus 2 growth chamber connector 220*c*.

Figure 10:
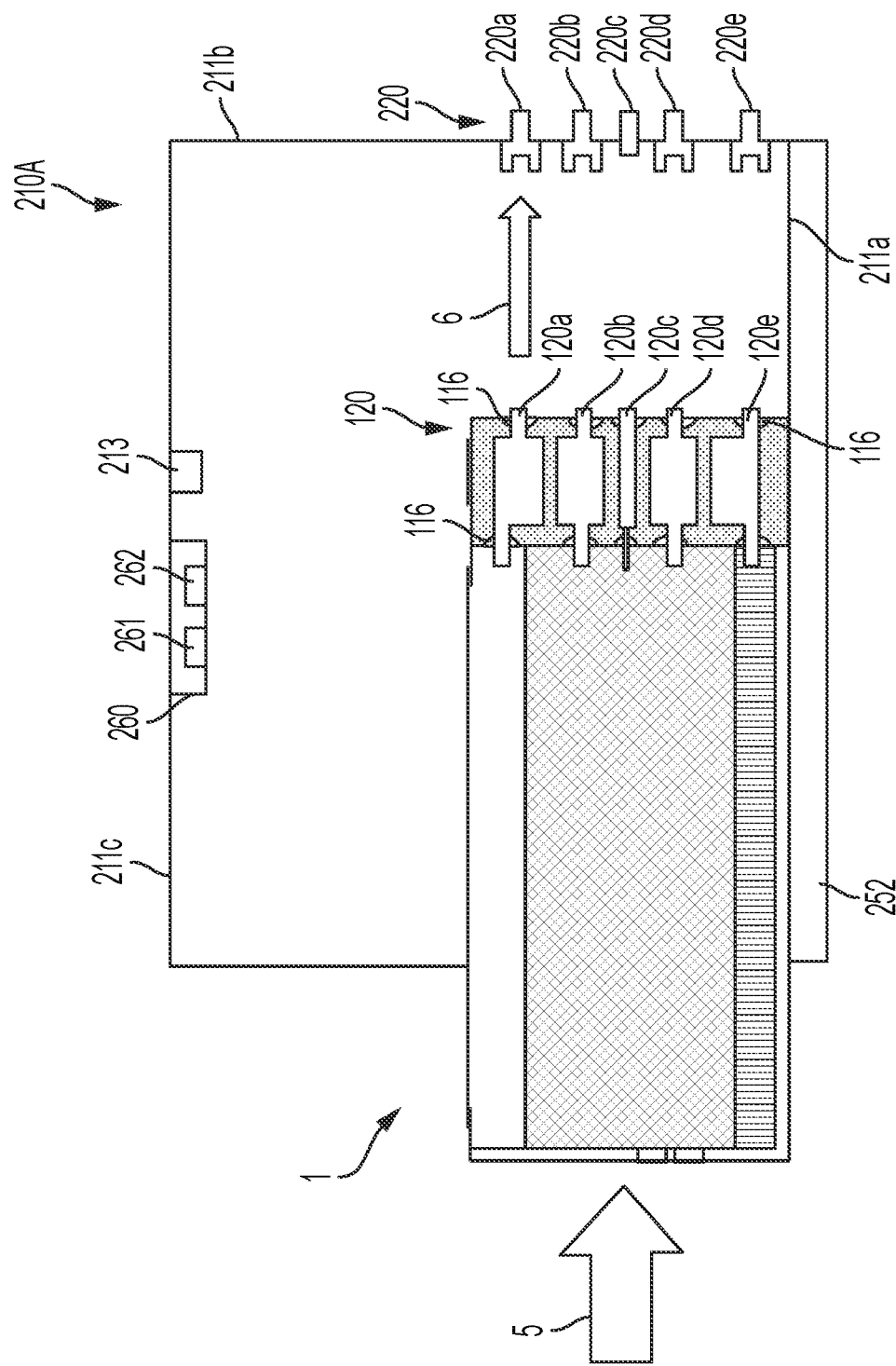
FIG. 10 is a cross-sectional view of a growth chamber of the environmental control apparatus of FIG. 7, taken along line C-C, and illustrating a mushroom growing apparatus being installed therein.
Figure 11:
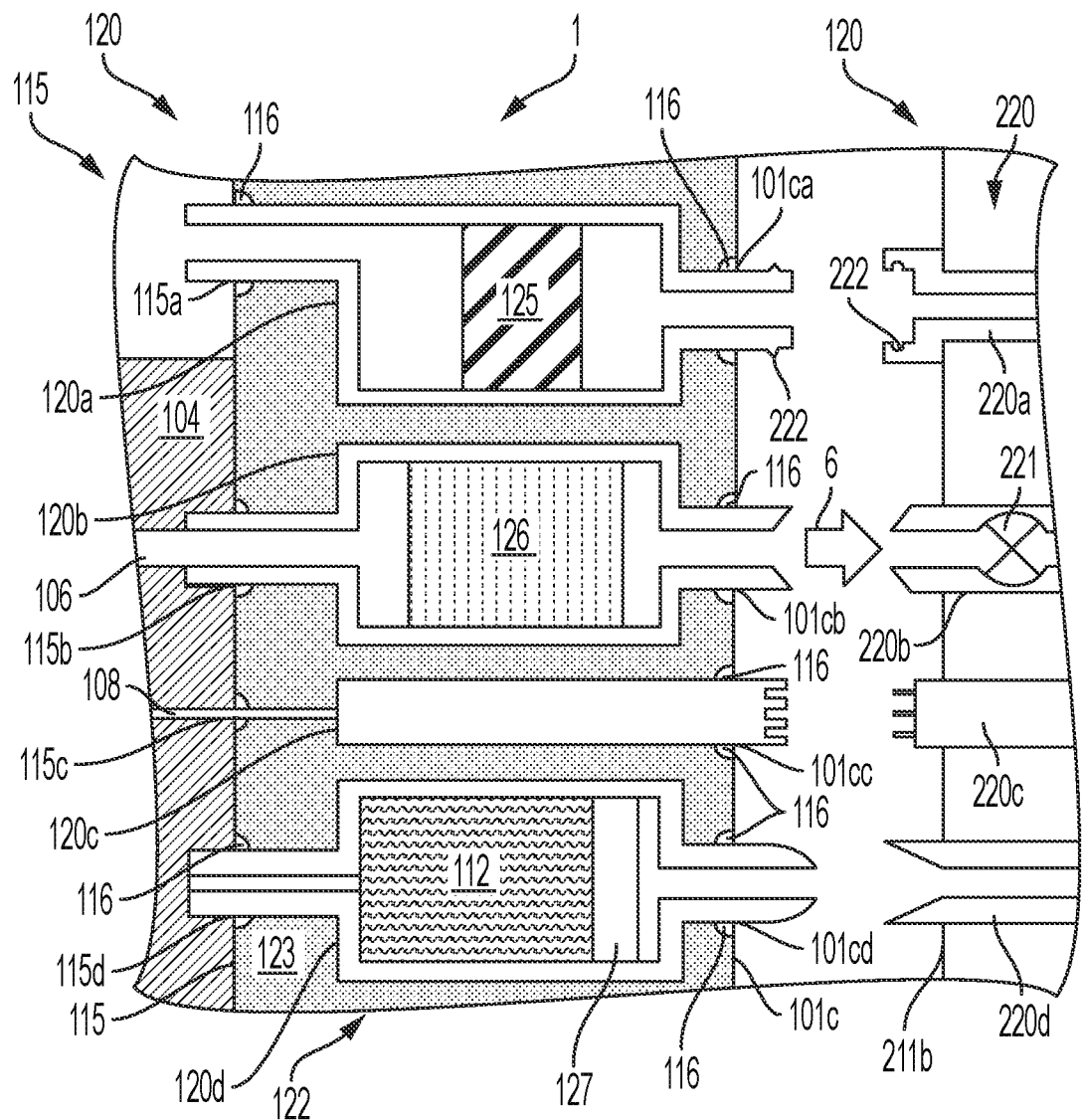
FIG. 11 illustrates greater detail of certain mushroom growing apparatus components in FIG. 10.

Referring to FIGS. 6, 7, 10 and 11, arrow 5 represents the installation of a mushroom growing apparatus 1 into growth chamber 210A within the environmental control apparatus 2. The number and configuration of the ports 120*a*, 120*b*, 120*c*, 120*d*, 120*e* are such that they align with, and matingly engage with, respective connectors 220*a*, 220*b*, 220*c*, 220*d*, 220*e* in the growth chamber 201A. Arrow 6 in FIGS. 10 and 11 represents the connection of the ports 120*a*, 120*b*, 120*c*, 120*d*, 120*e* with the respective connectors 220*a*, 220*b*, 220*c*, 220*d*, 220*e* in the growth chamber 210A such that the ports 120*a*, 120*b*, 120*c*, 120*d*, 120*e* are matingly engaged with and in communication with the respective connectors 220*a*, 220*b*, 220*c*, 220*d*, 220*e*. The connections between the input/output ports 120*a*, 120*b*, 120*d*, 120*e* and the respective connectors 220*a*, 220*b*, 220*d*, 220*e* may be accomplished using various connector modalities which form pressure-tight seals. Examples of connection modalities are depicted in FIG. 11 and include but are not limited to flexible and/or inflexible male and female connectors of various configurations 220*a* and 220*b*, or pin-and-socket connector 220*c*. Pressure-tight connection modalities may include groove-and-barb lock 222, groove-and-cam lock, taper-lock, O-rings, bushings or combinations thereof. Both input ports 120 and connectors 220 may comprise either or both male and female connection components. In some embodiments, one or more of the input/output connectors 220*a*, 220*b*, 220*d*, 220*e* may include a valve 221 which automatically closes when in a non-mated condition to prevent leakage from the air system 230 or the water system 240.

The information connection modalities between input and output port 120*c* and the respective connector 220*c* include electric or fiber optic pin and socket connectors as illustrated in FIG. 11, or flat surface contact points.

Closure of access door 202, and/or another mechanism applies pressure to the mushroom growing apparatus 1 to create tight and secure connections between input and output ports 120*a*, 120*b*, 120*c*, 120*d*, 120*e* and the respective connectors 220*a*, 220*b*, 220*c*, 220*d*, 220*e*. In FIGS. 8 and 9, a mechanism 214*a* is depicted in an engaged position, and a mechanism 214*b* is in a disengaged position. These mechanisms 214*a*, 241*b* may be manually operated by a user or may be automatically engaged and disengaged by the system controller 204.

In some embodiments, an indication signal light 309 or audible indication device 310 may be provided with the GUI 300 (FIG. 12) of the environmental control apparatus 2 to confirm correct insertion of a mushroom growing apparatus 1 into a respective growth chamber 210, and such that the various input/output ports are matingly engaged and in fluid communication with the respective input/output connectors of the growth chamber 210.

In some embodiments, the exterior dimensions of a mushroom growing apparatus 1 may substantially match the interior dimensions of a respective growth chamber 210A, 210B to facilitate correct installation of the mushroom growing apparatus 1. However, the dimensions and configuration of a mushroom growing apparatus 1 may vary.

In the illustrated embodiment, the environmental control apparatus 2 includes an electric power supply 270 (FIG. 9) that receives electric power from a standard 120V 60 Hz electrical outlet via an electrical connector 271 and converts the alternating electric current to direct electric current and increases and/or decreases the voltage as required to power the various components of the mushroom growing system 3.

In the illustrated embodiment, a pressure sensor 206 (FIG. 9) is located within the housing 201 and is configured to monitor air pressure within the housing 201. The system controller 204 receives signals from the pressure sensor 206 and utilizes these signals to govern air pressure within the housing 201 via the air supply system 230.

Referring to FIGS. 6, 7, and 8, in some embodiments, a lyophilizer 280 is provided and is configured to freeze-dry harvested mushrooms. The lyophilizer 280 may be disposed within a cavity 281 accessible through an opening in the housing 201 and covered by the access door 202 when the access door is in the closed position. In other embodiments, the lyophilizer cavity 281 may have its own access door. The lyophilizer 280 includes a vacuum pump which exhausts moist air to the atmosphere external to the housing 201. The lyophilizer 280 receives cooling resources from the heating and cooling devices within thermal regulating system 250 through direct thermal conductivity or via a circulating thermal transfer fluid.

In some embodiments, a mushroom growing apparatus 1 may be received from a manufacturer in an inoculated condition, with the inoculum 112 already disposed within the growth substrate 104. In other embodiments, a mushroom growing apparatus 1 may be received from a manufacturer in an uninoculated condition. A system operator inoculates the growth substrate 104 of such a mushroom growing apparatus 1 with self-supplied inoculum through a self-healing injection port 111. The growth substrate 104 may be inoculated by the operator immediately before or after installation of the mushroom growing apparatus 1 into a respective growth chamber 210A, 210B.

In some embodiments, an input port 120*d* (in FIG. 11) contains an injection device comprising a reservoir of inoculum 112 which is caused to be injected into the growth substrate when syringe-like piston 127 is activated by a system operator or by an a mechanical, electromagnetic, hydraulic or pneumatic impulse from the environmental control unit 2, conveyed via connector 220*d* to input port 120*d*.

Prior to installation of a mushroom growing apparatus 1 into a respective growth chamber 210A, 210B, a bar code and/or RFID device 107 disposed on a surface of, or within, the mushroom growing apparatus 1 is read by a reader 205 disposed on the front of, or within, the environmental control apparatus 2. Information encoded in the bar code and/or RFID device 107 is thereby provided to a computer program running on the system controller 204. This information may include growth medium characteristics and lot number, inoculum type and lot number, type of barrier or any other information related to the mushroom growing apparatus 1 characteristics which would inform the software running on processor 204. Alternatively, a handheld device, such as a mobile phone that is in communication with the system controller 204 may be utilized to read a bar code or other scan code on or associated with the mushroom growing apparatus 1.

A mushroom growth cycle begins when the input/output ports 120 of a mushroom growing apparatus 1 are matingly connected to the respective input/output connectors 220 within a growth chamber of the environmental control apparatus 2 and a system operator initiates operation of the mushroom growing system via the GUI 300. The growth cycle ends when an operator harvests the final flush of mature mushroom fruiting bodies. The mushroom growing apparatus 1 remains within a growth chamber for the entirety of a mushroom growth cycle.

The environmental control apparatus 2 maintains a prescribed environment within each mushroom growing apparatus 1 contained within a respective growth chamber according to information contained on the barcode or RFID device 107 or stored in the system controller memory, downloaded from a manufacturer server via the internet and/or provided by an operator. The environment may vary within a given mushroom growing apparatus 1 at different stages of a mushroom growth cycle.

Referring back to FIG. 9, the mushroom growing system 3 is automatically controlled by a system controller 204 which comprises one or more processors in communication with the air system 230, the water system 240, the thermal regulation system 250, and the illumination system 260. The one or more processors are configured to control the air system 230, the water system 240, the thermal regulation system 250, and the illumination system 260 so as to maintain a prescribed environment within each respective mushroom growing apparatus 1. The one or more processors are also configured to receive operating parameters for the air system 230, the water system 240, the thermal regulation system 250, and the illumination system 260 from an operator. In some embodiments, the one or more processors of the system controller 204 are configured to operate in a semi-automatic mode which defaults to manufacturer-provided algorithms unless overridden by a system operator, or manual mode in which a system operator sets all operating parameters at the beginning and/or at various time points in a growth cycle.

During a mushroom growth cycle, one or more of the following characteristics of water introduced into the interior cavity 105 of a mushroom growing apparatus 1 via the water system 240 are controlled: temperature, microbial content, mineral content, soluble organic compound content, pH. In addition, one or more of the following characteristics of air introduced into the interior cavity 105 of a mushroom growing apparatus 1 via the air system 230 are controlled: microbial content, temperature, humidity, volatile organic compound content, dust particle content. As such, during a mushroom growth cycle, the air system 230, the water system 240, the thermal regulation system 250, and the illumination system 260 are controlled to maintain a prescribed environment within the interior cavity 105 of a mushroom growing apparatus 1 for a certain period of time.

One or more computer programs running on the system controller 204 cause the processor to send digital and/or analog signals to a plurality of actuation devices within the environmental control unit 2 and its components such as, but not limited to, valves, pumps, switches, actuators, relays, power regulators, motors, heating and cooling devices, and light sources to maintain or modify the conditions within each mushroom growing apparatus.

In some embodiments, during a mushroom growth cycle, images of a growth substrate are acquired via a camera 213, and the images are processed via the processor 204 using at least one image processing algorithm.

The system controller 204 includes a wireless and/or hard-wire connection to the internet to facilitate remote system monitoring and/or diagnostics by a manufacturer, as well as transmission of data/information to and from a manufacturer, including computer program updates from time to time. A manufacturer may offer analytical software on its server, accessible to an operator who may submit digital growth records stored in the memory of the digital processor. The analytical software generates analytics of inputs, growth cycle time, and quantitative and qualitative yield of mushrooms.

Data uploaded from the mushroom growing system 3 to a manufacturer via an internet connection also informs improvements to system hardware and software. Anonymous and/or aggregated operator data may be posted on a manufacturer's website for operators to compare their own results. A facility allows operators to post comments and ask questions which may be answered by the manufacturer or other users.

In some embodiments, the system controller 204 includes a wireless connection to smart phones and/or other portable devices to facilitate the transmission of data, images, system status information and alerts to a system operator, and/or operator transmission of operating instructions to the system.

Figure 12:
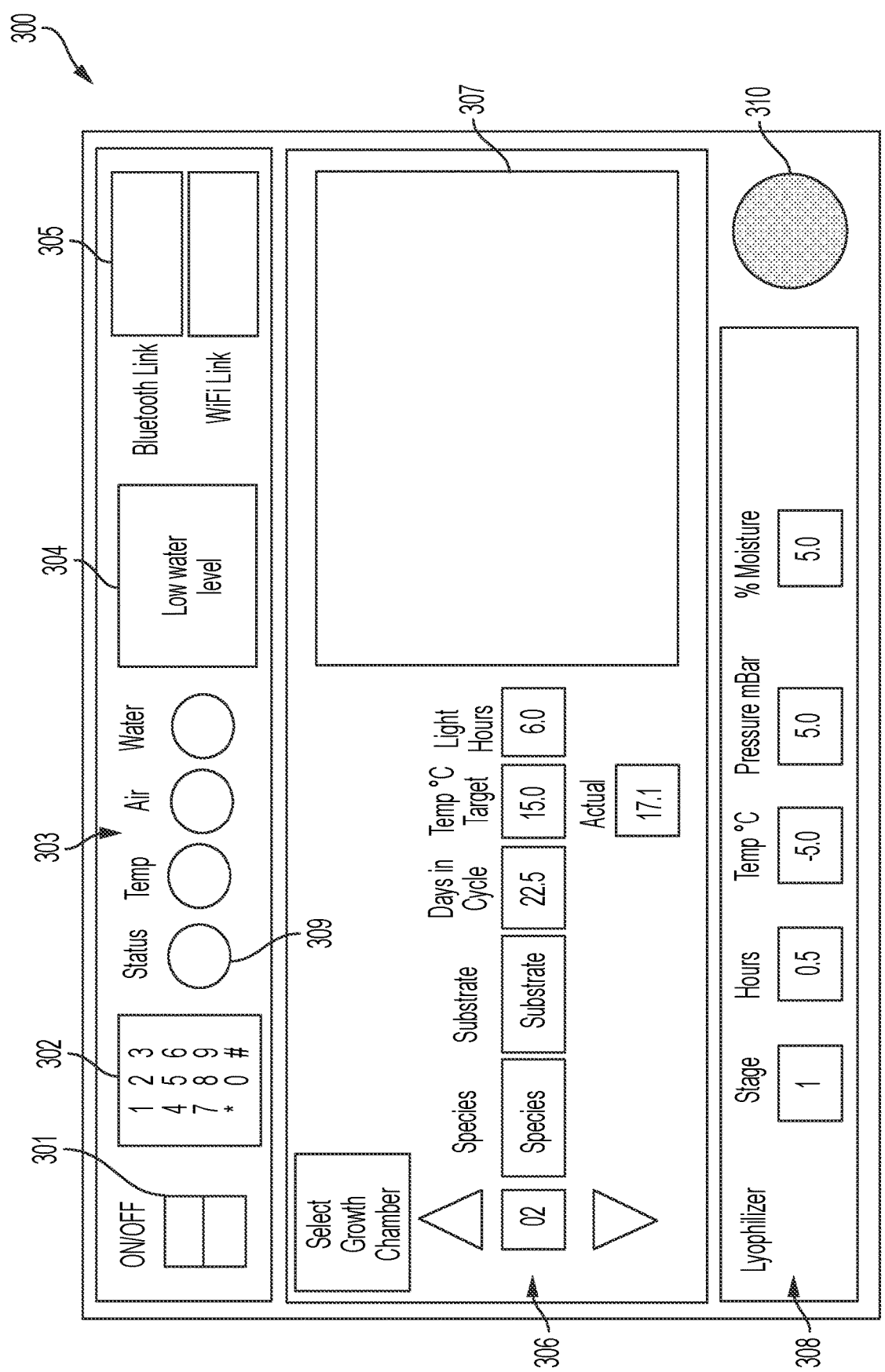
FIG. 12 illustrates an exemplary user interface that can be utilized with the environmental control apparatus of FIGS. 6-9, in accordance with some embodiments of the present inventive concepts.

Referring now to FIG. 12, an exemplary GUI 300 for the environmental control apparatus 2 is illustrated. The GUI 300 is configured to accept information inputs and display information regarding mushroom growing system operational status. The system controller 204 feeds data/information regarding machine operating parameters for display on the GUI 300 and receives operator instructions from the GUI touch screen. Alerts to excursions from desired system operating conditions appear on the GUI 300. The illustrated GUI 300 includes a main power switch touchscreen component 301 which controls electrical power input to the system 3. Touchscreen component 302 accepts an operator-established code to access mushroom growing system controls. Condition indicator lights 303 indicate certain system parameters by display different color light indications, while display 304 provides more specific information regarding the light signal indication. Display 305 indicates wireless connection status to the internet or other devices. Display screen 307 displays text information, graphic information, or digital images. Component 308 of the GUI 300 accepts lyophilizer operating parameters from the operator and displays lyophilizer operating status.

In some embodiments, proper engagement of a mushroom growing apparatus 1 within a growth chamber 210 is confirmed via an indicator light 309, audible signal from signal generator 310, or message on the GUI 300. Similarly, improper engagement, for example when input and output ports are not properly connected with growth chamber connectors, will generate an error indication.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:
1. A mushroom growing system, comprising:
a housing;
at least one growth chamber located within the housing, each growth chamber configured to receive a respective mushroom growing apparatus therein, each mushroom growing apparatus comprising:
a tray comprising a bottom wall and a circumferential side wall upwardly extending from the bottom wall to define an interior cavity, wherein the tray comprises at least one input port through which material is provided into the interior cavity, and at least one output port through which material is removed from the interior cavity, wherein the at least one input port and the at least one output port are configured to impede microbiological incursion into the interior cavity;
a growth substrate supported within the interior cavity, the growth substrate configured to be inoculated with inoculum comprising mycelium or spores;

a barrier material secured to the tray, wherein the barrier material overlies the interior cavity and aseptically seals the interior cavity;

an antimicrobial air filter configured to filter air provided into the interior cavity via the at least one input port; and an antimicrobial water filter configured to filter water provided into the interior cavity via the at least one input port;

wherein each growth chamber comprises at least one input connector configured to matingly receive the at least one input port of a respective mushroom growing apparatus, and at least one output connector configured to matingly receive the at least one output port of the respective mushroom growing apparatus when the mushroom growing apparatus is inserted within the growth chamber;

wherein each growth chamber is accessible via an opening in the housing, and wherein an access door is movably secured to the housing and movable between an open position and a closed position;

an air system configured to provide fresh air into and remove waste air from each mushroom growing apparatus contained within a respective growth chamber;

a water system configured to provide fresh water into and remove waste water from each mushroom growing apparatus contained within a respective growth chamber;

a thermal regulation system configured to independently maintain an interior temperature of each of respective mushroom growing apparatus within a predetermined range; and an illumination system configured to maintain illumination of the mushroom growing apparatus within a predetermined range.

2. The mushroom growing system of claim 1, further comprising at least one processor in communication with the air system, the water system, the thermal regulation system and the illumination system, wherein the at least one processor is configured to control the air system, the water system, and the thermal regulation system so as to maintain a prescribed environment within each respective mushroom growing apparatus.

3. The mushroom growing system of claim 2, further comprising memory in communication with the at least one processor, wherein the memory contains one or more algorithms utilized by the at least one processor to control the air system, the water system, the thermal regulation system, and the and the illumination system.

4. The mushroom growing system of claim 3, wherein the at least one processor is further configured to receive operating parameters for the air system, the water system, the thermal regulation system, and the illumination system from an operator.

5. The mushroom growing system of claim 1, wherein the thermal regulation system comprises a heating/cooling device selected from a group consisting of: a compression-expansion cycle heat pump, a resistive heater, a fluid heat exchange system, an air heat exchange system, one or more thermoelectric devices, and combinations thereof.

6. The mushroom growing system of claim 1, further comprising an illumination system comprising at least one light source configured to provide light within each growth chamber for at least one of: mushroom growth modulation, reflective imaging, fluorescence imaging.

7. The mushroom growing system of claim 1, further comprising an imaging system configured to monitor a surface condition of the growth substrate, mycelial growth, and fruiting body development within each mushroom growing apparatus within a respective growth chamber, the imaging system comprising a camera, a processor, and memory storing at least one image processing algorithm, wherein the processor is configured to acquire images captured by the camera and process the images using the at least one image processing algorithm.

\* \* \* \* \*